United States Patent [19]

Minamisawa et al.

[11] Patent Number: 4,482,660

[45] Date of Patent: Nov. 13, 1984

[54] PREPREG FOR MAKING A COMPOSITE HAVING HIGH ELONGATION AND HEAT RESISTANCE AND PROCESS FOR MAKING SUCH COMPOSITE WITH THE PREPREG

[75] Inventors: Tsuyoshi Minamisawa; Masato Andoh, both of Shizuoka, Japan

[73] Assignee: Toho Beslon Co., Ltd., Tokyo, Japan

[21] Appl. No.: 458,004

[22] Filed: Jan. 14, 1983

[30] Foreign Application Priority Data

Jan. 14, 1982 [JP] Japan ................................. 57-3341

[51] Int. Cl.³ ............................................. C08L 63/00
[52] U.S. Cl. .................................. 523/428; 523/467; 523/468; 525/113
[58] Field of Search ...................... 523/428, 467, 468; 525/113

[56] References Cited

U.S. PATENT DOCUMENTS 4,107,128 8/1978 Hosoi et al. .......................... 523/434
4,269,759 5/1981 Edelman .............................. 523/468

FOREIGN PATENT DOCUMENTS 51-20998 2/1976 Japan ................................. 525/113
52-58799 5/1977 Japan ................................. 523/468
52-74655 6/1977 Japan ................................. 523/468
53-102996 9/1978 Japan ................................. 525/113
57-21450 2/1982 Japan ................................. 525/113

Primary Examiner—Lewis T. Jacobs
Attorney, Agent, or Firm—Sughrue, Mion, Zinn, Macpeak & Seas

[57] ABSTRACT

A prepreg for making a composite is disclosed. The prepreg comprising reinforcing fibers impregnated with a resin composition comprising (A) an epoxy resin, (B) a reaction product of an epoxy resin and a butadiene-acrylonitrile copolymer having carboxyl groups on at least both terminals of the molecular chain of the copolymer, and (C) 4,4'-diaminodiphenylsulfone as a curing agent. A composite produced by curing this prepreg is high in both tensile elongation and heat resistance and is used with advantage as primary and secondary structural materials in aircraft.

30 Claims, No Drawings

PREPREG FOR MAKING A COMPOSITE HAVING HIGH ELONGATION AND HEAT RESISTANCE AND PROCESS FOR MAKING SUCH COMPOSITE WITH THE PREPREG

FIELD OF THE INVENTION

The present invention relates to a prepreg for making a composite having high elongation and heat resistance.

BACKGROUND OF THE INVENTION

Composites comprising reinforcing fibers such as carbon fibers or aromatic polyamide fibers and a matrix resin have high specific strength and rigidity, and are used as structural materials for aircraft. Conventional matrix resins having high heat resistance do not provide composites having high elongation even if the resins are reinforced with fibers having high elongation. A composite having high elongation has been produced by using a properly selected matrix resin composition having a high elongation. However, such matrix resin has poor heat resistance. Therefore, no prior art matrix resin satisfies the two conflicting requirements of high elongation and high heat resistance. In Table 1, the elongation and heat resistance of a composite produced by unidirectionally orienting carbon fibers (elongation>1.5%) impregnated with a conventional heat-resistant matrix resin are compared with those of a composite produced by unidirectionally orienting carbon fibers (elongation>1.5%) impregnated with a conventional high-elongation matrix resin.

TABLE 1

| Matrix resin | Elongation at break | Heat resistance of CFRP* | |
|---|---|---|---|
| | | ILSS** at room temp. | ILSS at 100° C. |
| Heat-resistance | 1.2% | 13.0 kg/mm² | 10.0 kg/mm² |
| Elongative | 1.6% | 9.8 kg/mm² | 4.7 kg/mm² |

*Carbon fiber reinforced plastic
**Inter laminer shear strength

The strand of carbon fibers used had a strength of 440 kg/mm², a modulus of elasticity of 24,100 kg/mm² and an elongation of 1.83%. As Table 1 shows, it has been very difficult to produce a composite that is high in both heat resistance and elongation, and this is one of the reasons why composites are conventionally used only as secondary structural members in aircraft. If composite could also be used as primary structural members, the weight of an aircraft could be greatly reduced and significant energy saving would be realized.

SUMMARY OF THE INVENTION

An object of the present invention is to provide a prepreg for making a composite having high elongation and high heat resistance.

The prepreg of the present invention comprises reinforcing fibers impregnated with a resin composition comprising (A) an epoxy resin, (B) a reaction product of an epoxy resin and a butadiene-acrylonitrile copolymer having carboxyl groups on at least both terminals of the molecular chain of the copolymer, and (C) 4,4'-diaminodiphenylsulfone as a curing agent.

DETAILED DESCRIPTION OF THE INVENTION

The fiber used in the present invention preferably has a high elongation. A prepreg of the present invention for making a composite having an extremely high elongation can be prepared by using carbon fibers having an elongation of 1.5% or more, glass fibers or aromatic polyamide fibers. Glass fibers and aromatic polyamide fibers usually have an elongation of 2.5% or more. Two or more kinds of these fibers may be used in combination in a single prepreg, or alternatively, two or more prepregs having different fibers may be used to form a single composite.

Epoxy resins are commonly employed in producing prepregs and such prior art resins can be employed in the present invention.

Examples of the epoxy resin incorporated in the present invention as component (A) are listed below:

1. Glycidylamine type epoxy resins

Those having an average epoxy equivalent (molecular weight of resin/number of epoxy group in a molecule; hereunder simply referred to as an epoxy equivalent) of 110 to 150, preferably from 120 to 135, are used. Such epoxy resins include, for example, N,N,N',N'-tetraglycidyldiaminodiphenylmethane (shown by formula (I)), N,N-diglycidylmethaaminophenol glycidyl ether, and a mixture with oligomers (degree of polymerization is 2-4) thereof, which are commercially available under the trade name Araldite MY 720 (manufactured by Ciba-Geigy Corporation) or Epototo YH 434 (Toto Kasei Co.) and YDM 120 (Toto Kasei Co.), respectively. It is preferred to use an epoxy resin mixture containing the oligomers in an amount of 10 to 40 wt% based on the resin.

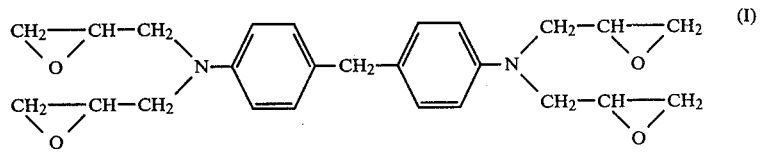

2. Novolak type epoxy resins (1) Phenolic novolak type epoxy resins

Those having an epoxy equivalent preferably of 160 to 200, more preferably from 170 to 190, are used, and they include, for example, Epikote 152 and 154 (Shell Chemicals Corp.), Araldite EPN 1138 and 1139 (Ciba-Geigy Corporation), Dow Epoxy DEN 431, 438, 439 and 485 (Dow Chemical Company), EPPN 201 (Nippon Kayaku Co., Ltd.) and Epicron N 740 (Dainippon Inki Kagaku Kogyo Co.).

(2) Cresol novolak type epoxy resins

Those having an epoxy equivalent preferably of from 180 to 260, more preferably, from 200 to 250 are used. Examples of such resins include, Ciga-Geigy ECN 1235, ECN 1273, EC N 1280 and ECN 1299 (manufactured by Ciba-Geigy Corporation), EOCN 102, 103 and 104 (manufactured by Nippon Kayaku Co.).

3. Bisphenol A type epoxy resins

Those having an epoxy equivalent preferably of from 150 to 1,000, more preferably from 300 to 600, are used, and the heat resistance of bisphenol A type epoxy resins having an epoxy equivalent more than about 1,000 is somewhat low. Illustrative bisphenol A type epoxy resins include Epikote 828, 834, 827, 1001, 1002, 1004, 1007 and 1009 (Shell Chemicals Corp.), Araldite CY 205, 230, 232 and 221, GY 257, 252, 255, 250, 260 and 280, Araldite 6071, 7071 and 7072 (Ciba-Geigy Corporation), Dow Epoxy DER 331, 332, 662, 663U and 662U (Dow Chemical Company), Epicron 840, 850, 855, 860, 1050, 3050, 4050 and 7050 (Dainippon Inki Kagaku Kogyo Co.), and Epototo YD-115, 115-CA, 117, 121, 127, 128, 128 CA, 128 S, 134, 001Z, 011, 012, 014, 014 ES, 017, 019, 020 and 002 (Toto Kasei Co.).

4. Brominated bisphenol A type epoxy resins

Those having an epoxy equivalent preferably of from 200 to 600, more preferably from 220 to 500, are used. Examples of such epoxy resin include Araldite 8011 (Ciba-Geigy Corporation) and Dow Epoxy DER 511 (Dow Chemical Co.).

5. Urethane-modified bisphenol A type epoxy resins

Those having an epoxy equivalent preferably of from 200 to 1,000, more preferably from 250 to 400, are used. Examples include Adeka Resin EPU-6, 10 and 15 (Asahi Denka Co., Ltd.).

6. Alicyclic epoxy resins

Those having an epoxy equivalent preferably of from 110 to 300, more preferably from 130 to 280, are used. Examples are Araldite CY-179, 178, 182 and 183 (Ciba-Geigy Corporation).

In the present invention epoxy resins may be used either alone or in combination. A prepreg containing at least 50 wt%, preferably at least 70 wt%, based on the total epoxy resin, of at least one of N,N,N',N'-tetraglycidyl diaminodiphenylmethane and N,N-diglycidyl methaaminophenyl glycidyl ether provides particularly high heat resistance. These epoxy resins are preferably combined with a novolak type epoxy resin, bisphenol A type epoxy resin, brominated bisphenol A type epoxy resin or urethane-modified epoxy resin.

The butadiene-acrylonitrile copolymer having carboxyl groups on at least both terminals and which is reacted with an epoxy resin to form component (B) is preferably liquid to facilitate the reaction with the epoxy resin and to provide a prepreg of good quality. More specifically, the copolymer preferably has a viscosity of about 500 to 8,000 poise, more preferably from about 1,000 to 7,000 poise, at 27° C. The butadiene-acrylonitrile copolymers which are solid provide a composite having somewhat low heat resistance. The acrylonitrile content of the copolymer is generally from 10 to 35 wt%, preferably from 15 to 30 wt%. the copolymer may contain up to 3 carboxyl groups including those at the two terminals, and such copolymer can be prepared by using at least one of acrylic and methacrylic acid as a comonomer.

The above-described copolymer can be obtained by radical copolymerization using a catalyst having carboxyl groups. When a compound represented by the following formula (II) is used as a catalyst for the production of a butadiene-acrylonitrile copolymer having terminal moieties including carboxyl groups as shown in the following formula (III) can be obtained.

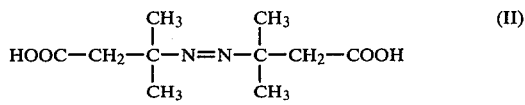

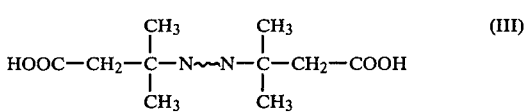

($\sim\sim$ shows copolymer moiety)

Examples for the above-described copolymerization catalysts include 4,4'-azobis-(4-cyanopentanoic acid) and 2,2'-azobis-(4-carboxy-2-methylbutyronitrile).

The preparation of the copolymer can also be conducted by using an anion copolymerization catalyst, for example, organic dilithium compound such as dilithium tetraphenylethane, dilithium trans-stylbene, dilithium polyisoprene, 1,4-dilithium butene or 1,5-dilithium pentan. After a butadiene-acrylonitrile copolymer is produced, the copolymer is subjected to a reaction with $CO_2$ gas, and then to a reaction with an acid such as HCl to produce the copolymer having carboxylic acid groups on at least both terminals of the molecular of the copolymer. The reactions proceed as shown below:

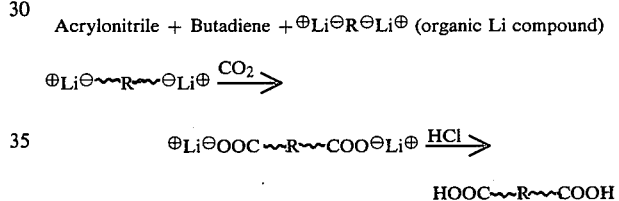

The butadiene-acrylonitrile copolymer is reacted with an epoxy resin so that at least terminal carboxyl groups react with epoxy rings. The reaction is carried out by using at least 2 equivalents of the epoxy group per equivalent of the carboxyl group (i.e., the ratio of the total number of epoxy groups in the epoxy resin to the total number of carboxylic acid groups in the copolymer is at least 2). The epoxy resin may be used in an excess amount with respect to the copolymer, and the unreacted epoxy resin remains in the prepreg as part of component (A). The conditions for the reaction between the copolymer and epoxy resin vary with the type of the epoxy resin. Usually, the reaction is effected at a temperature between 50° to 170° C. for 1 to 2 hours in the absence or presence of a catalyst such as triphenylphosphine. The epoxy resin to be reacted with the butadiene-acrylonitrile copolymer may be the same as the one used as component (A) or it may be one or more epoxy resins that are different from the one used as component (A). Example of component (B) include Hycar (B. F. Goodrich Chemical Co.).

Component (B) may contain as an optional ingredient nitrile rubber that is used to increase the melt viscosity of the resulting resin composition. A suitable nitrile rubber has a Mooney viscosity between 40 and 110 at 100° C. and an acrylonitrile content of 20 to 45 wt%. Carboxyl-modified nitrile rubbers having not more than 2 wt% of acrylic acid or methacrylic acid or both as a comonomer may also be used. Illustrative nitrile rubber include Nipol 1043, 1042, 1072 (Nippon Zeon Co.). The nitrile rubber may be used in an amount of 20 to 130 parts by weight, preferably from 30 to 110 parts by weight, per 100 parts by weight of the butadiene-acrylonitrile copolymer. The amount of butadiene-acrylonitrile copolymer in the reaction product, or optionally together with the nitrile rubber, in component (B) is 3 to 25 parts by weight, preferably from 5 to 20 parts by weight, per 100 parts by weight of the epoxy resin as component (A).

The 4,4'-diaminodiphenylsulfone as component (C) or curing agent may be used alone or in combination with a curing accelerator such as a boron trifluoride-monoethylamine complex. The accelerator is used in an amount of 0.05 to 3.0 parts by weight, preferably from 0.2 to 1.0 parts by weight, per 100 parts by weight of component (A). The curing agent may also be used in combination with dicyandiamide to prevent the prepreg resin composition from flowing during thermal curing. In this case, a curing accelerator such as 3-(3,4-dichlorophenyl)-1,1-dimethyl urea is used. The dicyandiamide is used in an amount of 0.3 to 1.2 parts by weight, preferably from 0.5 to 1.0 parts by weight, per 100 parts by weight of component (A). The total amount of component (C) is generally from 20 to 45 parts by weight, preferably from 25 to 35 parts by weight, per 100 parts by weight of component (A).

The prepreg of the present invention is produced by any conventional method, for example, by the following methods. The resin composition described above is dissolved in a solvent such as acetone, methyl ethyl ketone or methyl cellosolve, in a preferred concentration of 30 to 60 wt%. Reinforcing fibers, usually in a strand form comprising 500–300,000 filaments, are impregnated with the solution, usually, by dipping the fibers, into the solution, taking them out from the solution and drying to remove the solvent at a temperature which is generally between 90° and 120° C. over a period of 5 to 15 minutes. Usually, about 100 to 200 strands are used to form a sheet-like prepreg. Alternatively, a uniformly mixed resin composition of the present invention is melted at about 50° to 120° C., and the melted composition is coated on a releasing paper, usually in an amount of 30 to 300 g/m$^2$. On the resin surface of the thus prepared product unidirectionally oriented strands or fabrics are placed and embedded in to the resin under a pressure by a heat roller to prepare a sheet-like prepreg having a releasing paper. The resin content of the prepreg is usually from 30 to 50 wt%.

The resin composition of the present invention may contain fine silica or glass particles (usually having an average diameter of 0.1 to 20μ) to prevent the flowing of the prepreg resin composition when it is shaped with heat. The fine silica or glass powder is generally used in an amount of not more than 10 parts by weight per 100 parts by weight of the resin composition. The resin composition may be rendered flame-retardant by incorporating 1 to 5 parts by weight of fine particles (usually having an average diameter of 0.1 to 20μ) of antimony trioxide per 100 parts by weight of the resin composition. The conditions for curing the prepreg or prepregs of the present invention vary with the type of the epoxy resin used, and usually, the prepreg is cured at between 150° and 200° C. for 1 to 5 hours. To prevent the formation of voids, the prepreg or prepregs are typically cured under pressure of 3 to 7 kg/cm$^2$.

A composite was prepared from prepregs of the present invention having unidirectionally fibers oriented therein, and it had the following physical data:

|  | Number of laminated prepreg sheets |  |
|---|---|---|
| tensile strength | 8 | 200 kg/mm$^2$ or more |
| tensile modulus of elasticity | 8 | 13500–15500 kg/mm$^2$ |
| tensile elongation at break | 8 | 1.5% or more |
| ILSS at 23° C. | 21 | 11.0–13.5 kg/mm$^2$ |
| ILSS at 100° C. | 21 | 7–9.5 kg/mm$^2$ |

The present invention is now described in greater detail by reference to the following examples which are given here for illustrative purposes only and are by no means intended to limit the scope of the invention. Unless otherwise indicated, all parts are by weight in the examples.

EXAMPLE 1

Seventy parts of N,N,N',N'-tetraglycidyldiaminodiphenylmethane (Araldite MY 720), 15 parts of Dow Epoxy XD-7855 (Dow Chemical Company), 15 parts of Epikote 1001, the reaction product of 7 parts of Hycar CTBN 1300×13 (B. F. Goodrich Chemical Co., acrylonitrile content 27 wt%, 6500 poise at 27° C.) and 13 parts of Araldite-720 (equivalent ratio of functional groups is ¼) 37 parts of 4,4'-diaminodiphenylsulfone and 0.3 parts of BF$_3$-monoethylamine complex were dissolved in acetone to make a 35 wt% solution of resin composition. The solution was impregnated in 130 strands (oriented to sheet-like form) of Besphite ST-6000 (carbon fiber of Toho Beslon Co., Ltd.; a strand consists of 6,000 filaments having an elongation of 1.85%, tensile strength of 449 kg/mm$^2$ and tensile modulus of 24,000 kg/mm$^2$) and dried. A prepreg with a resin content of 40 wt% that had the fibers oriented unidirectionally was obtained. The prepreg sheets were cured at 180° C., under a pressure of 3.5 kg for 2 hours to form a composite having the following physical properties:

|  | Number of prepreg sheets |  |
|---|---|---|
| tensile strength | 8 | 221 kg/mm$^2$ |
| tensile modulus of elasticity | 8 | 13,400 kg/mm$^2$ |
| tensile elongation | 8 | 1.66% |
| ILSS at room temp. | 21 | 12.0 kg/mm$^2$ |
| ILSS at 100° C. | 21 | 8.0 kg/mm$^2$ |

EXAMPLE 2

Eighty parts of Araldite MY, 10 parts of Dow Epoxy XD-7855 (Dow Chemical Company), 10 parts of Adeka Resin EPU-6 (Asahi Denka Co., Ltd.), the reaction product of 10 parts of Hycar CTBN 1300×13 and 10 parts of Araldite MY 720, and 40 parts of 4,4'-diaminodiphenylsulfone were dissolved in acetone. A prepreg and a composite were produced from the resulting solution as in Example 1. The composite had the following physical properties:

| tensile strength | 239 kg/mm$^2$ |
|---|---|
| tensile modulus of elasticity | 15,500 kg/mm$^2$ |
| tensile elongation | 1.54% |
| ILSS at room temp. | 12.3 kg/mm$^2$ |
| ILSS at 100° C. | 8.2 kg/mm$^2$ |

EXAMPLE 3

Eighty parts of Araldite MY 720, 20 parts of Dow Epoxy XD-7855, the reaction product of 5 parts of Hycar CTBN 1300×13 and 10 parts of Araldite MY 720, 3 parts of Nippol 1072 (nitrile rubber of Nippon Zeon Co., Ltd.), 38 parts of 4,4'-diaminodiphenylsulfone, 0.8 part of dicyandiamide and 1.0 part of 3-(3,4-dichlorophenyl)-1,1-dimethyl urea were dissolved in a mixed solvent of methyl ethyl ketone and methyl cellosolve. A prepreg containing unidirectionally oriented fiber and a composite were produced as in Example 1. The composite had the following physical properties.

| | |
|---|---|
| tensile strength | 227 kg/mm$^2$ |
| tensile modulus of elasticity | 13,800 kg/mm$^2$ |
| tensile elongation | 1.65% |
| ILSS at room temp. | 12.3 kg/mm$^2$ |
| ILSS at 100° C. | 8.0 kg/mm$^2$ |

EXAMPLES 4 TO 9

Prepregs were prepared as in Example 1 by varying the proportions of components (A), (B) and (C) as indicated in Table 2. Composites were prepared from these prepregs and they had the physical properties shown in the same table.

TABLE 2

| | Example No. | 4 | 5 | 6 | 7 | 8 | 9 |
|---|---|---|---|---|---|---|---|
| Component | | | | | | | |
| (A) | glycidylamine type (1) | 70 | 70 | 80 | 80 | 80 | 0 |
| | phenolic novolak type (2) | 15 | 0 | 20 | 10 | 0 | 80 |
| | cresol novolak type (3) | 0 | 15 | 0 | 0 | 15 | 15 |
| | bisphenol A type (4) | 15 | 15 | 0 | 0 | 0 | 15 |
| | urethane modified bisphenol A type (5) | 0 | 0 | 0 | 10 | 0 | 0 |
| | brominated bisphenol A type (6) | 0 | 0 | 0 | 0 | 15 | 0 |
| (B) | butadiene-acrylonitrile copolymer having carboxyl group at both terminals (7) | 5 | 5 | 7 | 14 | 10 | 5 |
| | epoxy resin (8) | 8 | 8 | 8 | 6 | 5 | 8 |
| | nitrile rubber (9) | 0 | 0 | 3 | 0 | 3 | 0 |
| (C) | diaminodiphenylsulfone | 37 | 37 | 38 | 40 | 38 | 30 |
| | BF$_3$—monoethylamine complex | 0 | 0 | 0 | 0.3 | 0 | 0 |
| | DICY (10) | 0 | 0 | 0.8 | 0 | 0.8 | 0.8 |
| | DMU (11) | 0 | 0 | 1.0 | 0 | 1.0 | 1.0 |
| | Sb$_2$O$_3$ | 0 | 0 | 0 | 0 | 3 | 0 |
| Performance | | | | | | | |
| | tensile strength (kg/mm$^2$) | 231 | 243 | 245 | 249 | 243 | 242 |
| | tensile modulus of elasticity (kg/mm$^2$) | 14800 | 15300 | 14700 | 15100 | 14800 | 14400 |
| | tensile elongation at break (%) | 1.54 | 1.57 | 1.59 | 1.63 | 1.61 | 1.65 |
| | ILSS (kg/mm$^2$) 23° C. | 11.9 | 11.6 | 11.3 | 11.0 | 11.7 | 10.7 |
| | 100° C. | 8.9 | 8.6 | 8.6 | 8.3 | 8.6 | 7.7 |

(1) N,N,N',N'—tetraglycidyldiaminodiphenyl methane
(2) Dow Epoxy DEN 485
(3) Ciba-Geigy ECN 1235
(4) Epikote 1001
(5) Adeka Resin EPU 6
(6) Dow Epoxy DER 511
(7) Hycar CTBN 1300 X 13
(8) Araldite MY 720
(9) Nipol 1072
(10) dicyandiamide
(11) 3-(3,4-dichlorophenyl)-1,1-dimethyl urea

COMPARATIVE EXAMPLE 1

A prepreg wherein fibers were oriented unidirectionally was prepared using a heat-resistant epoxy resin conventionally used in aircraft and Besphite ST-6000. A composite was prepared from these prepregs and had the following physical data:

| | |
|---|---|
| tensile strength | 212 kg/mm$^2$ |
| tensile modulus of elasticity | 15,700 kg/mm$^2$ |
| tensile elongation | 1.35% |
| ILSS at room temp. | 13.1 kg/mm$^2$ |
| ILSS at 100° C. | 10.0 kg/mm$^2$ |

The composite had a high ILSS value and was highly heat resistant, but its tensile elongation was low.

COMPARATIVE EXAMPLE 2

A prepreg was prepared as in Comparative Example 1 except that using another conventional epoxy resin used, in aircraft composite. The composite prepared from these prepregs had the following physical properties:

| | |
|---|---|
| tensile strength | 225 kg/mm$^2$ |
| tensile modulus of elasticity | 14,000 kg/mm$^2$ |
| tensile elongation | 1.61% |
| ILSS at room temp. | 9.7 kg/mm$^2$ |
| ILSS at 100° C. | 4.3 kg/mm$^2$ |

The composite had high tensile elongation but it had a low ILSS value at 100° C. and was low in heat resistance.

While the invention has been described in detail and with reference to specific embodiments thereof, it will be apparent to one skilled in the art that various changes and modifications can be made therein without departing from the spirit and scope thereof.

What is claimed is:

1. A prepreg for making a composite having reinforcing fibers impregnated with a resin composition comprising (A) an epoxy resin wherein said epoxy resin of component (A) consists of 50 to 80 wt% based on the total epoxy resin of at least one glycidylamine epoxy resin selected from the group consisting N,N,N',N'-tetraglycidyldiaminodiphenylmethane, and N,N-diglycidylmethane aminophenol glycidyl ether, (B) a reaction product of an epoxy resin and a butadiene-acrylonitrile copolymer having carboxyl groups on at least both terminals of the molecular chain of the copolymer, and (C) 4,4'-diaminodiphenylsulfone as a curing agent and wherein component (B) is used in an amount of 3 to 25 parts by weight, per 100 parts by weight of the epoxy resin as component (A).

2. A prepreg according to claim 1 wherein the reinforcing fibers are selected from the group consisting carbon fibers having an elongation of 1.5% or more, glass fibers and aromatic polyamide fibers.

3. A prepreg according to claim 1 or 2 wherein the epoxy resin as component (A) is at least one resin selected from the group consisting a glycidylamine epoxy resin, a novolak epoxy resin, bisphenol A epoxy resin, a brominated bisphenol A epoxy resin, an urethane-modified bisphenol A epoxy resin, and an alicyclic epoxy resin.

4. A prepreg according to claim 3 wherein the novolak epoxy resin is at least one resin selected from the group consisting a phenolic novolak epoxy resin and a cresol novolak type epoxy resin.

5. A prepreg according to claim 3 wherein the glycidylamine epoxy resin has an average epoxy equivalent of from 110 to 150.

6. A prepreg according to claim 4 wherein the phenolic novolak resin has an average epoxy equivalent of from 160 to 200.

7. A prepreg according to claim 4 wherein the cresol novolak epoxy resin has an epoxy equivalent of from 180 to 260.

8. A prepreg according to claim 3 wherein the bisphenol A epoxy resin has an average epoxy equivalent of from 150 to 1,000.

9. A prepreg according to claim 3 wherein the brominated bisphenol A epoxy resin has an average epoxy equivalent of 200 to 600.

10. A prepreg according to claim 3 wherein the urethane-modified bisphenol A epoxy resin has an average epoxy equivalent of 200 to 1,000.

11. A prepreg according to claim 3 wherein the alicyclic epoxy resin has an average epoxy equivalent of 110 to 300.

12. A prepreg according to claim 1 wherein glycidylamine epoxy resin is combined with at least one epoxy resin selected from the group consisting of a novolak epoxy resin, bisphenol A epoxy resin, a brominated bisphenol A epoxy resin and an urethane-modified epoxy resin.

13. A prepreg according to claim 1 wherein the butadiene-acrylonitrile copolymer in component (B) is liquid.

14. A prepreg according to claim 13 wherein said copolymer has a viscosity of from 500 to 8,000 poise at 27° C.

15. A prepreg according to claim 1 wherein the butadiene-acrylonitrile copolymer in component (B) has an acrylonitrile content of from 10 to 35 wt%.

16. A prepreg according to claim 1 wherein a nitrile rubber is used as a part of component (B).

17. A prepreg according to claim 16 wherein the nitrile rubber has a Mooney viscosity of 40 to 110 at 100° C. and an acrylonitrile content of 20 to 45 wt%.

18. A prepreg according to claim 17 wherein the nitrile rubber is a carboxyl-modified nitrile rubber having not more than 2 wt% of at least one acid selected from the group consisting acrylic acid and methacrylic acid.

19. A prepreg according to claim 16 wherein the nitrile rubber as component (B) is used in an amount of from 20 to 130 parts by weight, per 100 parts by weight of the butadiene-acrylonitrile copolymer.

20. A prepreg according to claim 1 wherein the 4,4'-diaminodiphenylsulfone as component (C) is used in combination with a curing accelerator thereof.

21. A prepreg according to claim 20 wherein the accelerator is used in an amount of from 0.05 to 3.0 parts by weight per 100 parts by weight of component (A).

22. A prepreg according to claim 1 wherein the 4,4'-diaminodiphenylsulfone is used in combination with a dicyandiamide and an accelerator thereof.

23. A prepreg according to claim 22 wherein said dicyandiamide is used in an amount of 0.3 to 1.2 parts by weight per 100 parts by weight of component (A).

24. A prepreg according to claim 1 wherein the total amount of component (C) is from 20 to 45 parts by weight of component (A).

25. A prepreg according to claim 1 wherein the resin content of the prepreg is from 30 to 50 wt% based on the weight of the prepreg.

26. A prepreg according to claim 1 which contains fine particles of at least one material selected from the group consisting of silica and glass particles.

27. A prepreg according to claim 1 which contains fine antimony trioxide particles.

28. A process for producing a composite by curing a prepreg having reinforcing fibers impregnated with a resin composition comprising (A) an epoxy resin, wherein said epoxy resin of component (A) consists of 50 to 80 wt%, based on the total epoxy resin, of at least one glycidylamine epoxy resin selected from the group consisting N,N,N',N'-tetraglycidyldiaminodiphenylmethane and N,N-diglycidylmethane aminophenol glycidyl ether, (B) a reaction product of an epoxy resin and a butadiene-acrylonitrile copolymer having carboxyl groups on at least both terminals, and (C) 4,4'-diaminodiphenylsulfone as a curing agent and wherein component (B) is used in an amount of 3 to 25 parts by weight, per 100 parts by weight of the epoxy resin as component (A).

29. A process for producing a composite according to claim 28 wherein a nitrile rubber is used as a part of component (B).

30. A process for producing a composite according to claim 28 wherein the 4,4'-diaminodiphenylsulfone is used in combination with dicyandiamide and an accelerator thereof.

* * * * *